(12) United States Patent
Trainin et al.

(10) Patent No.: US 10,009,476 B2
(45) Date of Patent: Jun. 26, 2018

(54) METHOD, APPARATUS, AND COMPUTER READABLE MEDIUM FOR QUALITY OF SERVICE SIGNALING FOR REVERSE DIRECTION PROTOCOL

(71) Applicant: Intel Corporation, Santa Clara, CA (US)

(72) Inventors: Solomon Trainin, Haifa (IL); Ophir Edlis, Modiin (IL); Michael Glik, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 14/573,148

(22) Filed: Dec. 17, 2014

(65) Prior Publication Data

US 2016/0183292 A1    Jun. 23, 2016

(51) Int. Cl.
*H04L 12/50* (2006.01)
*H04M 7/00* (2006.01)
*H04W 72/12* (2009.01)

(52) U.S. Cl.
CPC ..... *H04M 7/0063* (2013.01); *H04W 72/1278* (2013.01)

(58) Field of Classification Search
CPC .............. H04W 72/1249; H04W 7/0063

USPC ......................... 370/337, 412, 389
See application file for complete search history.

(56) References Cited

U.S. PATENT DOCUMENTS

| 9,236,925 B2* | 1/2016 | Lee ................ H04B 7/063 |
| 2013/0229996 A1* | 9/2013 | Wang ........... H04W 72/0413 370/329 |
| 2016/0119881 A1* | 4/2016 | Merlin ............ H04W 52/54 370/328 |

* cited by examiner

*Primary Examiner* — Dang Ton
(74) *Attorney, Agent, or Firm* — Schwegman Lundberg & Woessner, P.A.

(57) ABSTRACT

Methods, apparatuses, and computer readable media configured for quality of service signaling for reverse direction protocol are disclosed. A STA may include circuitry. The circuitry may be configured to: generate a first MPDU; configure a reverse RDG field of the MPDU; configure a TSID field of the MPDU; and configure an access category constraint field of the MPDU to indicate to the second STA a constraint on MPDUs that the second STA can transmit in a reverse grant. The constraint may be: that the second STA transmit MPDUs with a second TSID that has a same value as the first TSID, that the second STA transmit MPDUs with a user priority of a second TSID that corresponds to a user priority of the first TSID, and/or that the second STA transmit MPDUs with an access category of a second TSID that corresponds to an access category of the first TSID.

25 Claims, 8 Drawing Sheets

METHOD, APPARATUS, AND COMPUTER READABLE MEDIUM FOR QUALITY OF SERVICE SIGNALING FOR REVERSE DIRECTION PROTOCOL

TECHNICAL FIELD

Embodiments pertain to wireless networks. Some embodiments relate to Institute of Electronic and Electrical Engineers (IEEE) 802.11, IEEE 802.11ad, 60 gigahertz (GHz) local area networks (LAN), 60 GHz personal area networks (PAN), direction multi-gig (DMG), and/or next generation 60 GHz. Some embodiments relate to millimeter wave communications and communications in the 60 GHz unlicensed frequency band. Some embodiments relate to reverse direction grants and to quality of service.

BACKGROUND

One issue with communicating data over a wireless network is the overhead associated with gaining access to the wireless medium. Another issue is maintaining a quality of service for some packets, such as voice over Internet protocol (VoIP) packets. Therefore, there is a need in the art for improved access to the wireless medium and improved quality of service.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
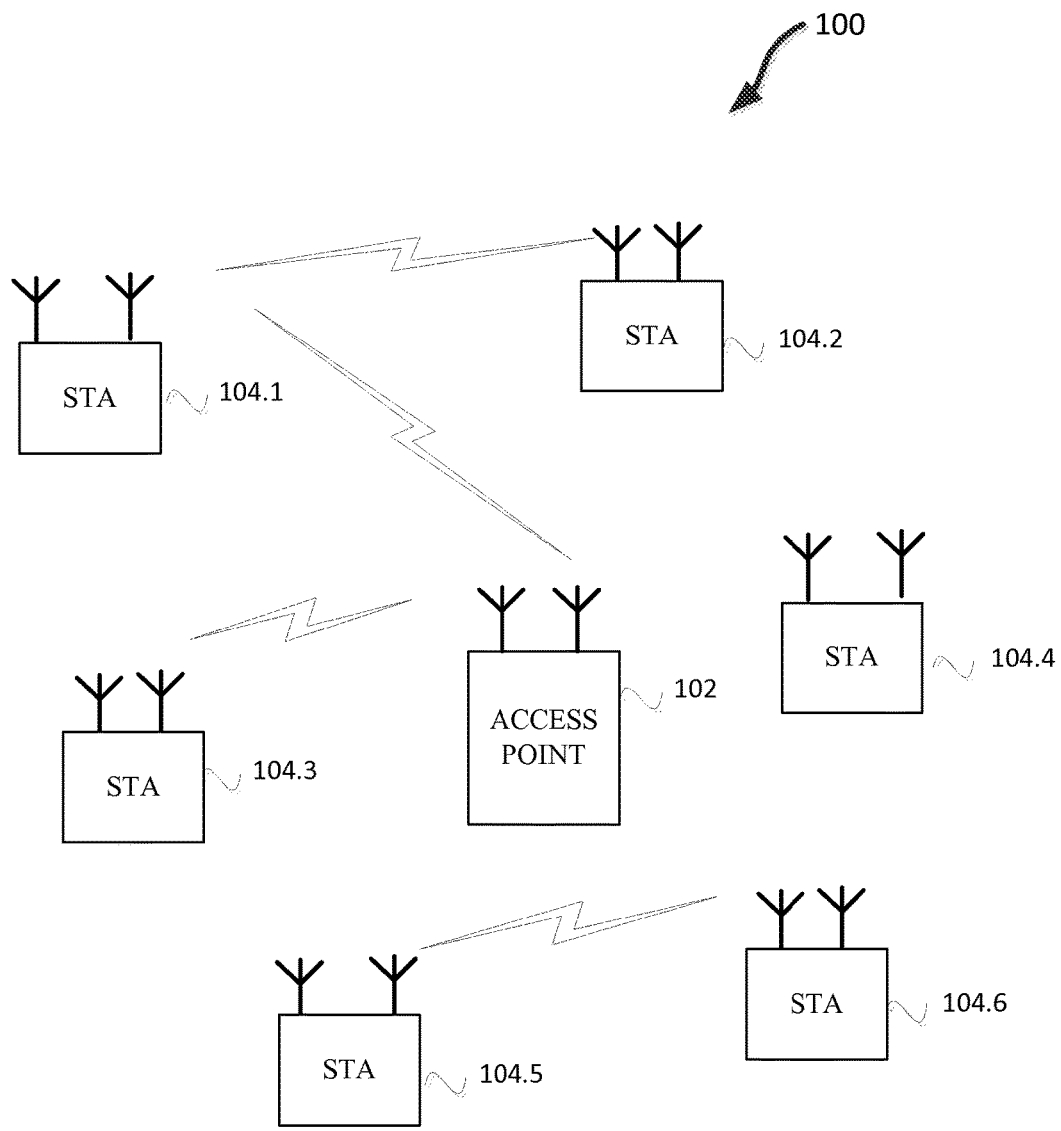
FIG. 1 illustrates a wireless network, in accordance with some embodiments.

FIG. 1 illustrates a wireless network 100, in accordance with some embodiments. The wireless network 100 may comprise an access point (AP) 102, and a plurality of STAs 104. The wireless network 100 may be a personal basic service set (PBSS), which may be the operating area of the network formed by STAs 104 operating on 60 GHz. One of the STAs 104 or AP 102 in the PBSS may act as a PBSS control point/access point (PCP/AP) to coordinate the channel access among the STAs 104 and/or AP 102 in the PBSS. An AP 102 and/or STA 104 operating at 60 GHz may be called a directional multi gigabit STA (DMG-STA).

The AP 102 and/or the STAs 104 may be wireless transmit and receive devices such as cellular telephones, handheld wireless devices, wireless glasses, wireless watches, wireless personal devices, tablets, printers, set-top devices, or other devices. The AP 102 and/or STAs 104 may be configured to transmit and receive using a local area wireless communication technique or a communication technique such as an IEEE 802.11, 802.11a/ad/g/ag/n/ac/ax/s/e/u, WiFi®, 60 GHz LAN, 60 GHz PAN, DMG, Next Generation 60 GHz, or a communication technique such as BlueTooth®, BlueTooth® Low Energy (BLE), 802.15.4, neighbor aware networking (NAN) program, near-field communication (NFC), and/or a wireless personal area network (WPAN) wireless technology or communication technique.

In other embodiments, the AP 102 and/or STAs 104 may also implement different technologies such as CDMA2000, CDMA2000 1x, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), or other technologies.

The AP 102 and/or STAs 104 may use two or more protocols simultaneously. Some of the protocols define protocols where the STAs 104 communicate with an AP 102, and some define protocols for STAs 104 to communicate with one another. Some protocols, such as IEEE 802.11, define protocols for both communicating with the AP 102 and for peer-to-peer communication.

The STAs 104 may be configured for peer-to-peer communication where two or more devices connect directly without the need to go through the AP 102. For example, STA 104.5 and STA 104.6 are communicating with a peer-to-peer relationship without communicating with the AP 102, and may be using, for example, BlueTooth®, or 802.11ad where one of the STAs 104.5, 104.6 acts as a PCP/AP. STA 104.3 is communicating with the AP 102 using, for example, 802.11ad. STA 104.1 is communicating with STA 104.2 with a peer-to-peer relationship, and STA 104.1 is communicating with the AP 102 using, for example 802.11ad. The AP 102 may act as a master to the STAs 104 in some protocols. The AP 102 and P2P devices 104 may be configured to operate in accordance with orthogonal frequency division multiple access (OFDMA) on a number of channels.

In example embodiments, the AP 102 and/or STAs 104 may operate in accordance with high-efficiency wireless or high-efficiency Wi-Fi (HEW) communication. In example embodiments, the AP 102 and/or STAs 104 operate in accordance with multi-user multiple-input multiple-output (MU-MIMO), OFDMA, and/or space division multiple access.

In some embodiments, a frame, which may be a HEW frame, may be configurable to have a bandwidth of one of 20 megahertz (MHz), 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.03125 MHz, 2.5 MHz, 5 MHz and 10 MHz or a combination thereof may also be used. A frame may be configured for transmitting a number of spatial streams. In example embodiments, there may be three channels of 2160 MHz bandwidth each in a 60 GHz spectrum.

In example embodiments, the AP 102 and/or STAs 104 operate in accordance with one or more of the following group: service period channel access (SPCA), enhanced distributed channel access (EDCA), and SPCA-EDCA (SEMM). The AP 102 and/or STAs 104 may acquire one or more channels of the wireless medium for a transmit opportunity that has a fixed duration. The AP 102 and/or STAs 104 may perform a RD grant (RDG) where the AP 102 and/or STAs 104 grant the transmit opportunity to another AP 102 and/or STA 104. The AP 102 and/or STA 104 that performs the RDG may be termed a RD initiator, and the AP 102 and/or STA 104 that receives the RDG may be termed a RD responder.

Two or more STAs 104 that are communicating using peer-to-peer communication may be called a peer-to-peer (P2P) group. For example, STA 104.5 and STA 104.6 are a P2P group. One STA 104 may act as a P2P group owner and the other STA 104 may act as the P2P client. A basic station set (BSS) may comprise the STA 104 that are communicating with the AP 102 with the BSS being identified by a basic service set identification (BSSID). The BSS may operate on a primary channel and one or more secondary channels or sub-channels. The P2P protocols may operate on the same or different channels as the BSS.

STAs 104 and/or AP 102 may be configured to operate in accordance with the functions, methods, and apparatuses described herein in conjunction with FIGS. 1-9 for quality of service signaling for reverse direction protocol and for indicating that additional data is available during a reverse grant.

Figure 2:
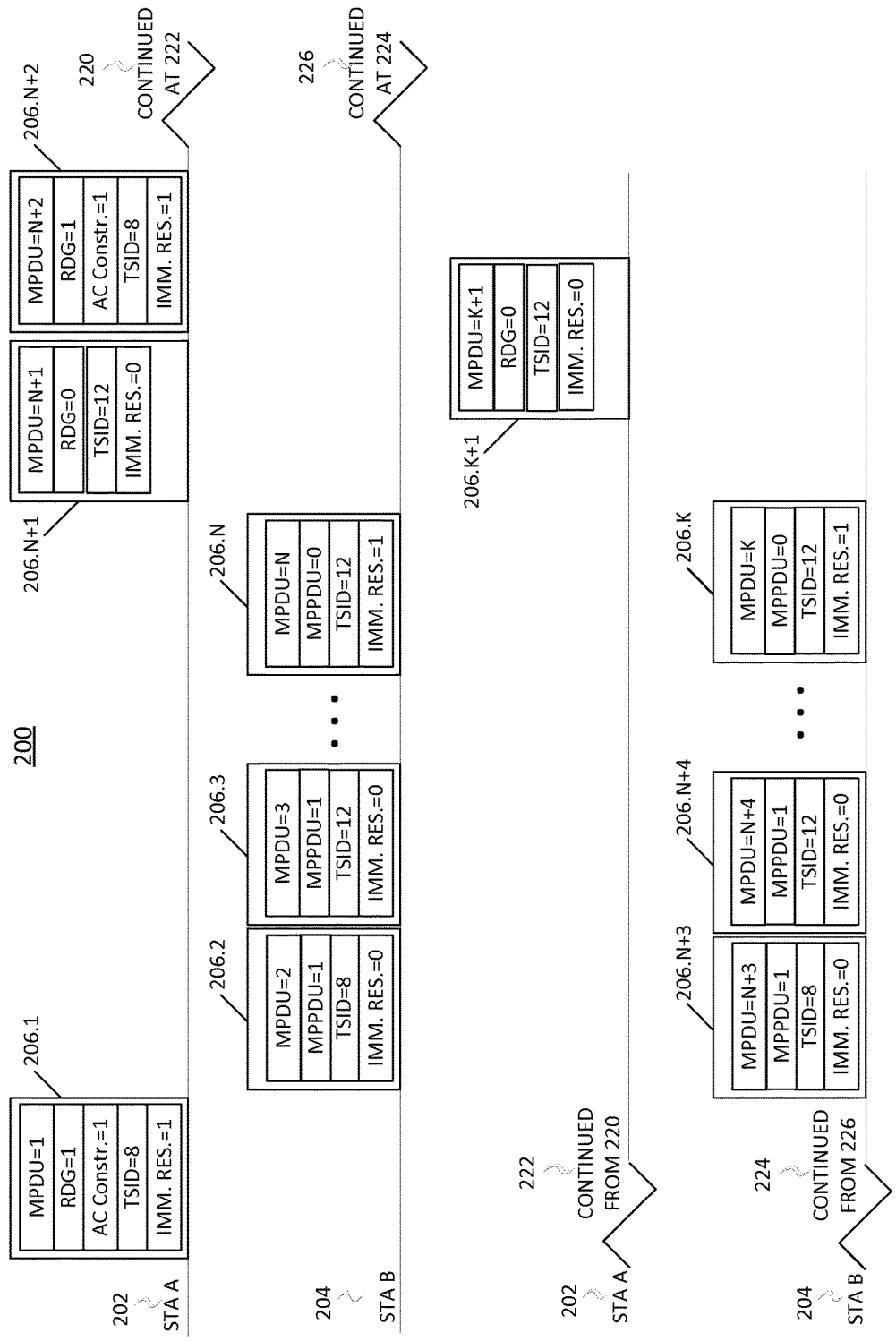
FIG. 2 illustrates a method of an example for quality of service limits for reverse direction grants where traffic stream identifications (TSIDs) of a media access control (MAC) protocol data unit (MPDU) have a same user priority (UP) as a UP of a TSID of an MPDU that initiated the reverse grant, according to example embodiments.

FIG. 2 illustrates a method 200 of an example for quality of service limits for reverse direction grants where TSIDs of a MPDU have a same UP as a UP of a TSID of an MPDU that initiated the reverse grant, according to example embodiments.

Figure 3:
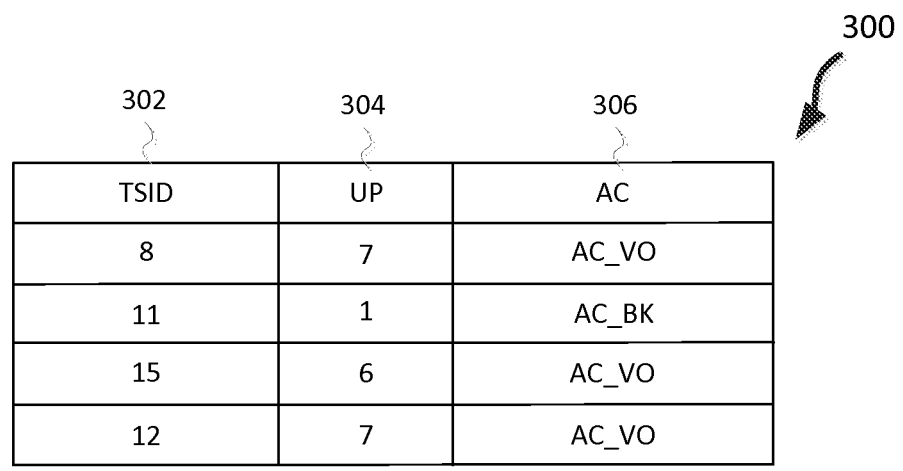
FIG. 3 illustrates a table of TSID values with their UP and access category (AC) values.

FIGS. 2 and 3 will be described with one another. FIG. 3 illustrates a table 300 of TSIDs 302 with the UPs 304 to which the TSIDs 302 are allocated and with AC 306 values of the UPs 304. The TSIDs 302 may be identifiers that are assigned to MPDUs by a layer above the MAC layer (see 906 FIG. 9). The UP 304 may be a UP 304 assigned to the user by a layer above the MAC layer. In example embodiments, the AC 306 may be determined from the UP 304.

Illustrated in FIG. 2 are STA A 202, STA B 204, and MPDUs 206. STA A 202 and STA B 204 may be STAs as described in conjunction with FIG. 1. STA A 202 may be a transmission opportunity (TxOP) holder so that STA A 202 has the right for transmission. STA B 204 may not have the right for transmission.

The method 200 may begin at 206.1 with STA A 202 transmitting MPDU 206.1. The MPDU 206.1 may include RDG=1, access category (AC) constraint=1, TSID=8, immediate response required=1, and address 1 (not illustrated), which may be the address of STA B 204. Each of the MPDUs 206 that are transmitted by STA A 202 include the address of STA B 204 as a destination address, and each of the MPDUs 206 that are transmitted by STA B 204 include the address of STA A 202 as a destination address.

The MPDU=1 may be a number for illustrative purposes. In operation, sequence numbers are assigned separately by each STA. The RDG=1 may indicate to STA B 204 that STA A 202 is giving STA B 204 an opportunity to transmit. A duration field will indicate for how long STA B 204 may transmit. STA A 202 may be called a reverse direction (RD) initiator because RDG=1 and STA A 202 is giving the opportunity to transmit to STA B 204. STA B 204 may be called a reverse direction responder because it is receiving a MPDU 206.1 where the RDG=1 and the address 1 is equal to the address of STA B 204. STA B 204 is being given an opportunity to transmit.

The TSID=8 indicates a traffic stream identification for the MPDU 206.1 of STA A 202. Immediate response required=1 indicates that STA B 204 should immediately respond to MPDU 206.1.

The AC constraint=1 indicates that STA A 202 is constraining the types of MPDUs 206 that STA B 204 may transmit during the reverse direction grant. In example embodiments, an AC constraint=1 may indicate that STA B 204 (RD responder) may only transmit MPDUs with a TSID that is the same as the TSID of STA A 202 (RD initiator). In example embodiments, an AC constraint=1 may indicate that STA B 204 (RD responder) may only transmit MPDUs with a TSID that has a same AC as the AC of the TSID of STA A 202 (RD initiator). In example embodiments, an AC constraint=1 may indicate that STA B 204 (RD responder) may only transmit MPDUs with a TSID that has a same UP 304 as a UP 304 of STA A (RD initiator). In example embodiments, an AC constraint=0 may indicate that STA B 204 (RD responder) may transmit MPDUs without regard to the TSID of the MPDU. An AP 102 and/or STA 104 may be configured to operate in accordance with one or more of the above constraints on the MPDUs transmitted in the reverse grant. In method 200 the constraint is based on the UP of the TSID.

In method 200, AC constraint=1 indicates that STA B 204 may only transmit MPDUs 206 with a TSID of a same UP as the UP that the TSID of the MPDU 206.1 transmitted by STA A 202 is allocated to.

The method 200 continues with STA B 204 transmitting MPDU 206.2 as the immediate response to MPDU 206.1 required by the MPDU 206.1 by assertion of immediate response=1. MPDU 206.2 has a number of 2 (MPDU=2), a more PHY protocol data unit (MPPDU)=1, a TSID=8, and an immediate response=0. The MPPDU=1 indicates there are more MPDUs 206 to follow.

The method 200 continues with STA B 204 transmitting MPDU 206.3. MPDU 206.3 has a number of 3 (MPDU=3), a MMPDU=1, a TSID=12, and an immediate response=0. The TSID=12 of MPDU 206.3 has an UP of 7 from FIG. 3. TSID=8 of MPDU 206.1 has an UP of 7 so the UP of MPDU 206.3 matches the UP of MPDU 206.1. The MPPDU=1 indicates there are more PPDUs 206 to follow.

The method 200 continues with STA B 204 transmitting zero or more MPDUs 206 after MPDU 206.3 that have TSIDs with a same UP as the UP of the TSID of the MPDU 206.1 transmitted by STA A 202.

The method 200 continues with STA B 204 transmitting MPDU 206.N. MPDU 206.N has a number of N (MPDU=N), a MMPDU=0, a TSID=12, and an immediate response=1. The TSID=12 of MPDU 206.N has an UP of 7 from FIG. 3. TSID=8 of MPDU 206.1 has an UP of 7 so the UP of MPDU 206.N matches the UP of MPDU 206.1. The MPPDU=0 indicates there are no more MPDUs 206 to follow. The immediate response=1 indicates that STA A 202 should respond immediately.

The method 200 continues with STA A 202 transmitting MPDU 206.N+1, which is sent in response to immediate response=1 of MPDU 206.N. The MPDU 206.N+1 may include reverse direction grant (RDG)=0, TSID=12, and immediate response required=0.

The method 200 continues with STA A 202 transmitting MPDU 206.N+2. The MPDU 206.N+2 may include reverse direction grant (RDG)=1, AC constraint=1, TSID=8, and immediate response required=1. The RDG=1 may indicate to STA B 204 that STA A 202 is giving STA B 204 an opportunity to transmit. The timeline of STA A 202 is continued at 222. The timeline of STA B 204 is continued at 224.

The method 200 continues with STA B 204 transmitting MPDU 206.N+3 as an immediate response to MPDU 206.N+2 as required since immediate response=1 in MPDU 206.N+2. MPDU 206.N+3 has a number of N+3 (MPDU=N+3), a MPPDU=1, a TSID=8, and an immediate response=0. The MPPDU=1 indicates there are more MPDUs 206 to follow.

The method 200 continues with STA B 204 transmitting MPDUs 206.N+4 through MPDU 206.K. In each case, the UP=7 of the TSID=12 of the MPDU transmitted by STA B 204 has the same UP=7 as the TSID=8 of MPDU 206.N+2 so that STA B 204 transmits in accordance with AC constraint=1 of MPDU 206.N+2.

In example embodiments, the method 200 illustrated in FIG. 2, where the RD responder (STA B 204) is limited to transmitting MPDUs 206 with TSIDs that are allocated to a same UP as the TSID of the RD initiator (STA A 202) may be used in conjunction with one or more of SPCA, EDCA, and SEMM.

Figure 4:
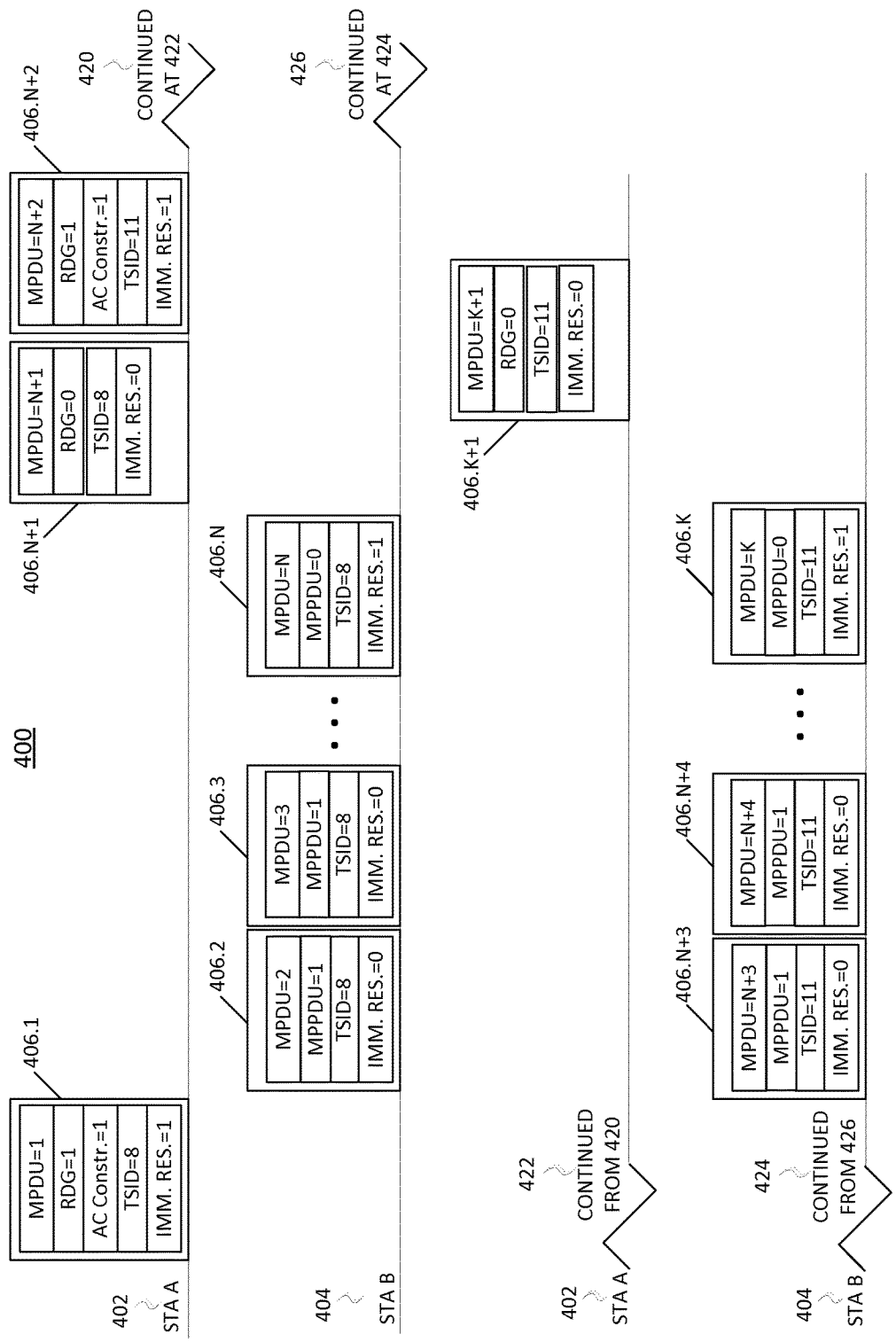
FIG. 4 illustrates a method of an example for quality of service limits for reverse direction grants where TSIDs of MPDUs have a same value of a TSID of an MPDU that initiated the reverse grant, according to example embodiments.

FIG. 4 illustrates a method 400 of an example for quality of service limits for reverse direction grants where TSIDs of MPDUs have a same value of a TSID of an MPDU that initiated the reverse grant, according to example embodiments. The method 400 illustrates where AC constraint=1 indicates to the RD responder (STA B 404) that the TSID of transmitted MPDUs 406 have to have the same value as the TSID of the RD initiator (STA A 402).

For example, STA A 402 transmits MPDU 406.1 with MPDU=1, RDG=1, AC constraint=1, TSID=8, and immediate respond=1. The MPDU 406.1 indicates that STA A 402 is giving STA B 404 an opportunity to transmit by setting RDG=1, and that AC constraint=1 so that STA B 404 must only transmit MDPUs 406 with TSID=8. STA B 404 transmits MPDU 406.2 with TSID=8 in response MPDU 406.1, which has immediate response=1. STA B 404 then transmits MPDU 406.3 through MPDU 406.N, all of which have TSID=8.

The method 400 continues with STA A 402 transmitting MPDU 406.N+1 as an immediate response to MPDU 406.N, and then transmitting MPDU 406.N+2 with RDG=1, AC constraint=1, TSID=11, and immediate response=1. The timeline of STA A 402 is continued at 422. The timeline of STA B 404 is continued at 424. STA B 404 transmits MPDU 406.N+3 with TSID=11 as an immediate response to MPDU 406.N+2. STA B 404 then transmits MPDUs 406.N+4 through MPDU 406.K with TSID=11 to comply with AC constraint=1 in MPDU 406.N+2. Finally, STA A 402 transmits MPDU 406.K+1 as an immediate response to MPDU 406.K.

In example embodiments, the method 400 illustrated in FIG. 4 where the RD responder (STA B 404) is limited to transmitting MPDUs 406 with the same TSID as the TSID of the RD initiator (STA A 402) may be used in conjunction with one or more of SPCA, EDCA, and SEMM.

Figure 5:
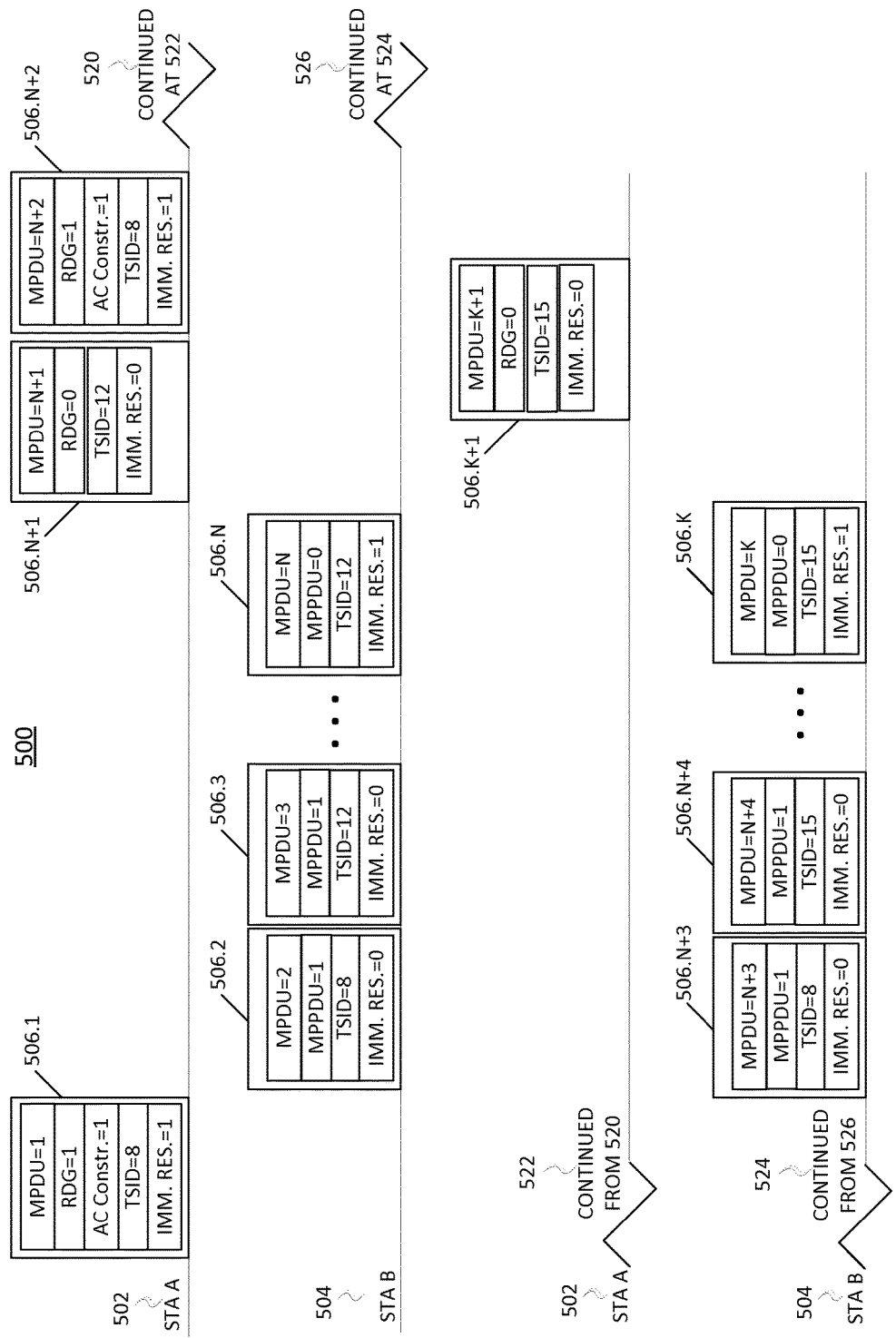
FIG. 5 illustrates a method of an example for quality of service limits for reverse direction grants where TSIDs have a same AC as a TSID of an MPDU that initiated the reverse direction grant, according to example embodiments.

FIG. 5 illustrates a method 500 of an example for quality of service limits for reverse direction grants where TSIDs have a same AC as a TSID of an MPDU that initiated the reverse direction grant, according to example embodiments. The method 500 illustrates where AC constraint=1, which indicates to the RD responder (STA B 504) that transmitted MPDUs 506 are constrained to have a TSID value with the same AC (e.g., see FIG. 3, 306) as an AC of a TSID of an MPDU 506 of STA A 504 (RD initiator) that initiates the RDG.

For example, STA A 502 transmits MPDU 506.1 with MPDU=1, RDG=1, AC constraint=1, TSID=8, and immediate respond=1. The MPDU 506.1 indicates that STA A 502 is giving STA B 504 an opportunity to transmit by setting RDG=1, and that AC constraint=1 so that STA B 504 may transmit MDPUs 506 with TSIDs that have the same AC as the AC of TSID=8. STA B 504 transmits MPDU 506.2 with TSID=8 as an immediate response to MPDU 506.1. STA B 504 then transmits MPDU 506.3 through MPDU 506.N all of which have TSID=12. The AC of TSID=8 is AC_VO (from FIG. 3), and the AC of TSID=12 is AC_VO (from FIG. 3).

The method 500 continues with STA A 502 transmitting MPDU 506.N+1 in response to MPDU 506.N, which has immediate response=1, and then transmitting MPDU 506.N+2 with MPDU=N+2, RDG=1, AC constraint=1, TSID=8, and immediate respond=1.

The method 500 continues with STA B 504 transmitting MPDU 506.N+3 with TSID=8 in immediate response to MPDU 506.N+2. STA B 504 then transmits MPDUs 506.N+4 through 506.K. MPDUs 506.N+3 through MPDU 506.K are transmitted by STA B 504 in compliance with the constraint that the AC of the TSIDs be the same as the AC of the TSID of MPDU 506.N+2 transmitted by STA A 502. The MPDUs 506.N+3 through 506.K each have a TSID of either 8 or 15. A TSID=8 has an AC of AC_VO (from FIG. 3), and TSID=15 has an AC of AC_VO (from FIG. 3). The method 500 continues with STA A 502 transmitting MPDU 506.K+1 in immediate response to MPDU 506.K.

In example embodiments, the method 500 illustrated in FIG. 5 where the RD responder (STA B 504) is limited to transmitting MPDUs 506 with a TSID that has a same AC as the TSID of a MPDU that initiated the RDG (transmitted by STA A 502) may be used in conjunction with one or more of SPCA, EDCA, and SEMM.

Figure 6:
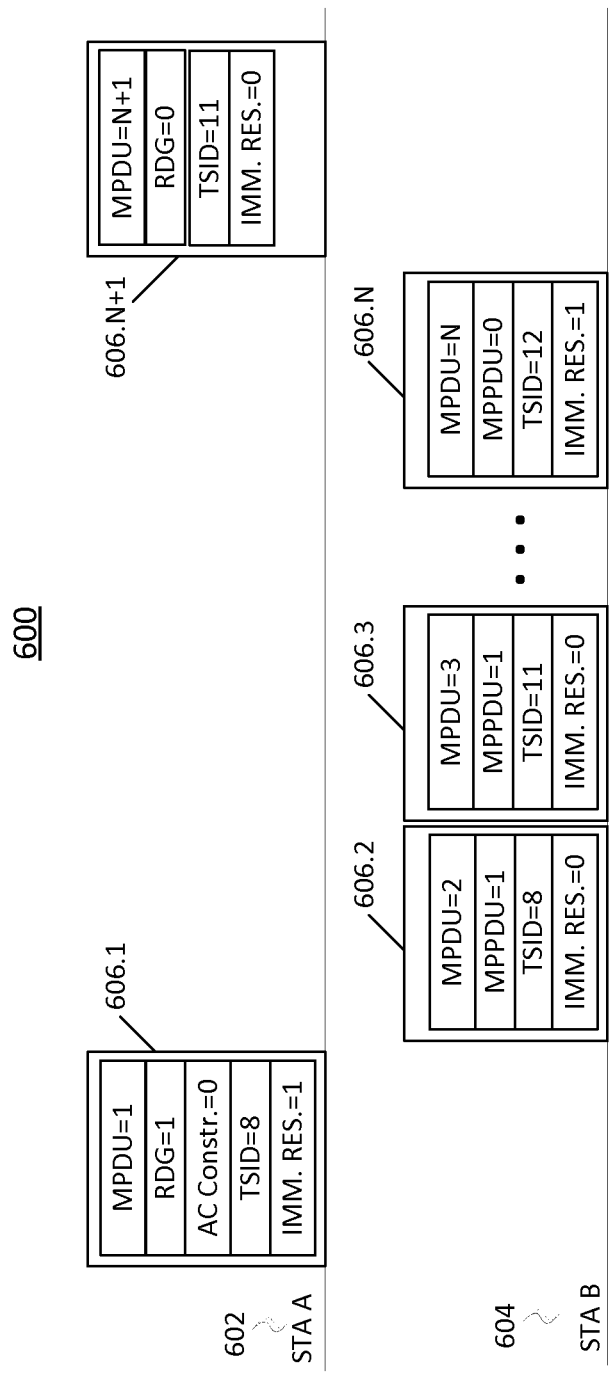
FIG. 6 illustrates a method of an example for quality of service limits for reverse direction grants where TSID values are not constrained, according to example embodiments.

FIG. 6 illustrates a method 600 of an example for quality of service limits for reverse direction grants where TSID values are not constrained, according to example embodiments. The method 600 illustrates where AC constraint=0, which indicates to the RD responder (STA B 604) that transmitted MPDUs 606 may contain any value for TSID regardless of the TSID value of the RD initiator (STA A 602).

For example, STA A 602 transmits MPDU 606.1 with MPDU=1, RDG=1, AC constraint=0, TSID=8, and immediate respond=1. The MPDU 606.1 indicates that STA A 602 is giving STA B 604 an opportunity to transmit by setting RDG=1, and that AC constraint=0 so that STA B 604 may transmit MDPUs 606 with any value for TSID. STA B 604 transmits MPDU 606.2 through MPDU 606.N all of which have TSID=8, 11, or 12. STA B 604 transmits MPDU 606.2 in immediate response to MPDU 606.1. STA B 604 is not constrained by the TSID values since AC constraint=0 in MPDU 606.1. The method 600 continues with STA A 602 transmitting MPDU 606.N+1 in immediate response to MPDU 606.N.

In example embodiments, the method 600 illustrated in FIG. 6 where the RD responder (STA B 604) is permitted to transmit MPDUs 606 with any value of TSID since the RD initiator (STA A 602) set AC constraint=0 may be used in conjunction with one or more of SPCA, EDCA, and SEMM.

Figure 7:
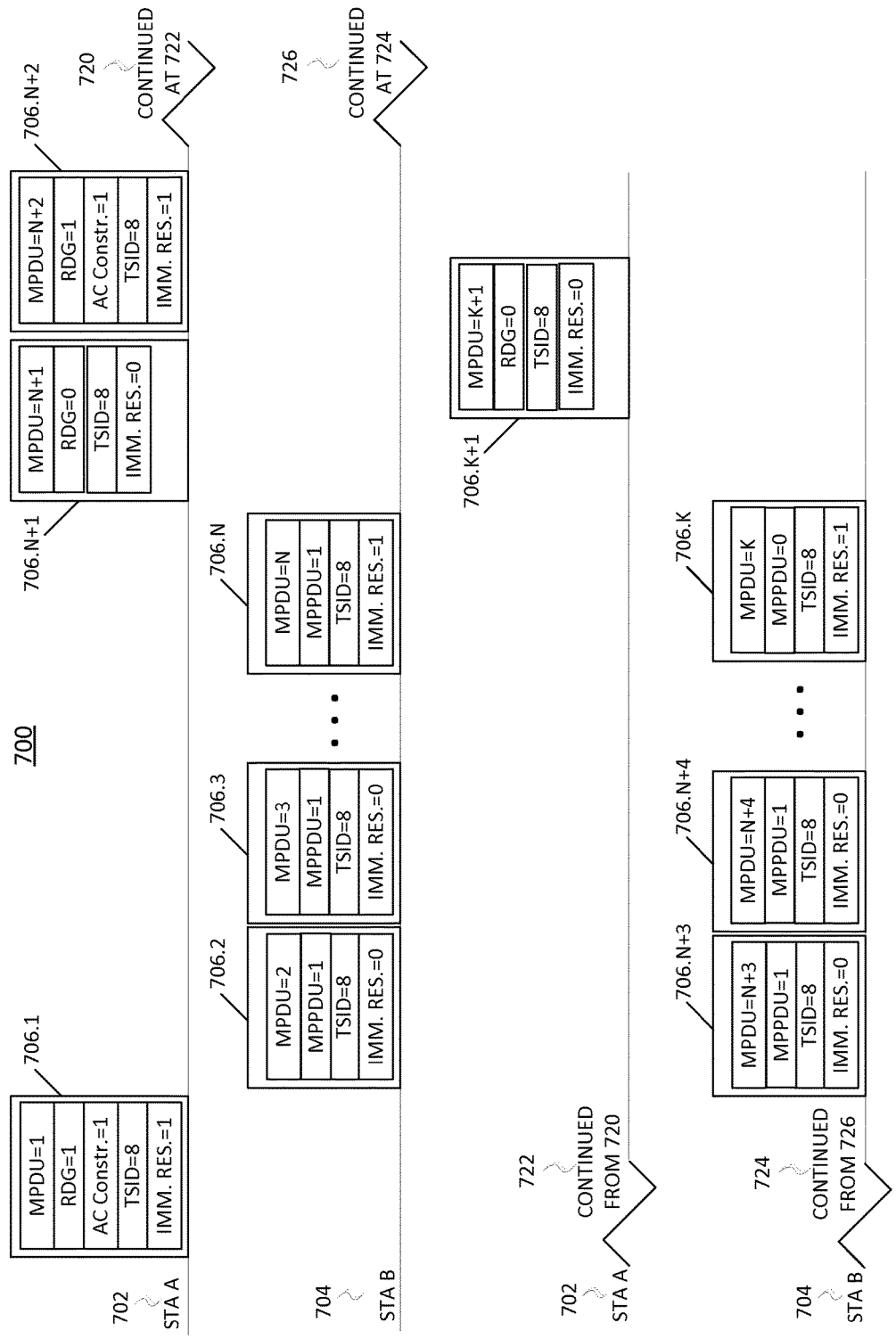
FIG. 7 illustrates a method of an example for indicating that a reverse direction (RD) responder has more data, according to example embodiments.

FIG. 7 illustrates a method 700 of an example for indicating that a RD responder has more data, according to example embodiments. The method 700 illustrates how a RD responder (STA B 704) may indicate to a RD initiator (STA A 702) that the RD responder (STA B 704) has additional data.

For example, STA B 704 may transmit MPDU 706.N with immediate response=1 and MPPDU=1 to STA A 702. This may indicate to STA A 702 that STA B 704 has additional data to transmit. STA A 702 may respond by sending MPDU 706.N+2 with RDG=1 so STA B 704 may transmit more data. STA B 704 may then transmit MPDUs 706.N+3 through 706.K which may include the additional PPDUs that STA B 704 indicated to STA A 702 that STA B 704 would like to transmit. The method 700 continues with STA A 702 transmitting MPDU 706.K+1 with RDG=0, TSID=8, and immediate response=0.

In example embodiments, the method 700 may be used in conjunction with one or more of the methods 200, 400, 500, and 600. As illustrated, method 700 is in accordance with method 400 where ac constraint=1 means that the TSIDs of the RD responder (STA B 404) have to be the same as the TSIDs of the MPDU that initiated the RD and that was transmitted by the STA A 402. The MPDUs 706.1 through 706.K+1 are transmitted in accordance with the method 400.

In example embodiments, the method 700 illustrated in FIG. 7 where a RD responder may transmit a MPDU with MPPDU=1 and immediate response=1 to indicate to an RD initiator that the RD responder has additional PPDUs to transmit may be used in conjunction with one or more of SPCA, EDCA, and SEMM.

Figure 8:
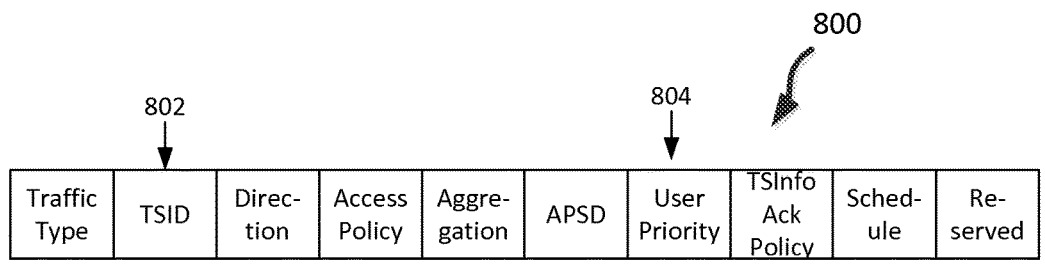
FIG. 8 illustrates information exchanged between devices, according to example embodiments.

FIG. 8 illustrates information exchanged between devices, according to example embodiments. A field 800 may include information that associates a TSID 802 with a UP 804. The RD responder may use the TSID 802 to determine the UP 804 of a TSID 802. The UP 804 of the TSID 802 may, in example embodiments, be determined by the RD responder based on the UP 804 and TSID 802 of the field 800.

Figure 9:
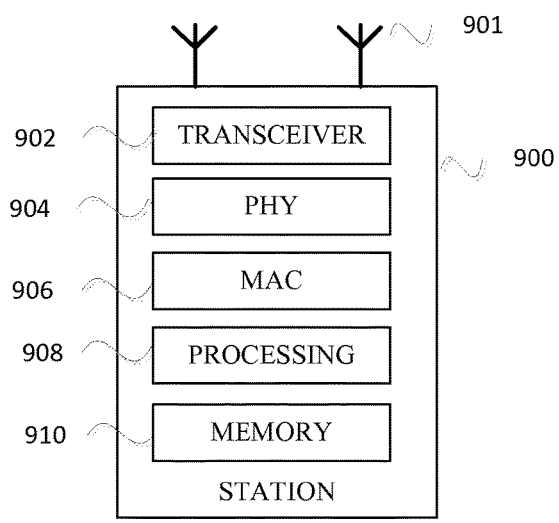
FIG. 9 illustrates a wireless station (STA), in accordance with some embodiments.

FIG. 9 illustrates a wireless STA 900, in accordance with some embodiments. STA 900 may be suitable for operating as AP 102 (FIG. 1) or a STA 104 (FIG. 1). In accordance with embodiments, STA 900 may include, among other things, a transmit/receive element (for example an antenna) 901, a transceiver 902, PHY 904 and MAC 906. PHY 904 and MAC 906 may be compliant with one or more wireless technologies. For example, the PHY 904 and MAC 906 may be compliant with one or more of the wireless standards or technologies disclosed in conjunction with FIG. 1. MAC 906 may be arranged to configure PPDUs and arranged to transmit and receive PPDUs, among other things.

STA 900 may also include other processing circuitry 908 and memory 910, both of which may be configured to perform the various operations described herein. In example embodiments, the processing circuitry 908 is hardware circuitry. The processing circuitry 908 may be coupled to the transceiver 902, which may be coupled to the transmit/receive element 901. While FIG. 9 depicts the processing circuitry 908 and the transceiver 902 as separate components, the processing circuitry 908 and the transceiver 902 may be integrated together in an electronic package or chip.

The PHY 904 may be arranged to transmit the P2P packets. The PHY 904 may include circuitry for modulation/demodulation, up conversion/down conversion, filtering, amplification, and so forth. In some embodiments, the processing circuitry 908 may include one or more processors. The processing circuitry 908 may be configured to perform functions based on instructions being stored in a random-access memory (RAM) or read-only memory (ROM), or based on special purpose circuitry. In some embodiments, the processing circuitry 908 may be configured to perform one or more of the functions described herein for quality of service signaling for reverse direction protocol and for indicating additional MPDUs as described in conjunction herein and in conjunction with FIGS. 1-8.

In some embodiments, two or more antennas may be coupled to the PHY 904 and arranged for sending and receiving signals including transmission of packets. In example embodiments, one or more antennas may be used to transmit in accordance with one or more of the wireless technologies disclosed in conjunction with FIG. 1. The STA 900 may include a transceiver 902 to transmit and receive data such as P2P packets. The memory 910 may store information for configuring the other circuitry to perform operations for quality of service signaling for reverse direction protocol and/or to indicate between an RD initiator and RD responder.

In some embodiments, the STA 900 may be configured to communicate using OFDM communication signals over a multicarrier communication channel. In some embodiments, STA 900 may be configured to communicate in accordance with one or more specific communication standards, such as the IEEE 802.11ad standard discussed herein, although the scope of the example embodiments of the STA 900 provided is not limited in this respect as they may also be suitable to transmit and/or receive communications in accordance with other techniques and standards such as those described in conjunction with FIG. 1.

In some embodiments, the STA 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as Bluetooth®, Bluetooth® Low Energy, 802.11ad, 802.11 or 802.16, or other device that may receive and/or transmit information wirelessly.

In some embodiments, the mobile device may include one or more of a keyboard, a display, a non-volatile memory port, multiple antennas, a graphics processor, an application processor, speakers, and other mobile device elements. The display may be an LCD screen including a touch screen. The one or more transmit/receive elements 901 may comprise one or more directional or omnidirectional antennas, including, for example, dipole antennas, monopole antennas, patch antennas, loop antennas, microstrip antennas or other types of antennas suitable for transmission of radio frequency (RF) signals. In some MIMO embodiments, the antennas may be effectively separated to take advantage of spatial diversity and the different channel characteristics that may result.

Although the STA 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is a first wireless station (STA) for quality of service signaling for reverse direction protocol including circuitry. The circuitry may be configured to: generate a media access control (MAC) protocol data unit (MPDU); configure a reverse direction grant (RDG) field of the MPDU to indicate that the first wireless STA is to provide a reverse grant to a second wireless STA; configure a destination address field of the MPDU to be an address of the second wireless STA; configure a first traffic stream identification (TSID) field of the MPDU to be a TSID associated with the MPDU; and configure an access category constraint field of the MPDU to indicate to the second wireless STA a constraint on MPDUs that the second wireless STA can transmit in the reverse grant, where the constraint on MPDUs that the second wireless STA can transmit is based on the first TSID field.

In Example 2, the subject matter of Example 1 can optionally include where the constraint is that the second wireless STA transmit MPDUs with a second TSID field that has a same value as the first TSID field.

In Example 3, the subject matter of Example 1 can optionally include where the constraint is that the second wireless STA transmit MPDUs with a user priority of a second TSID field that corresponds to a user priority of the first TSID field.

In Example 4, the subject matter of Example 3 can optionally include where the user priority of the second TSID field and the user priority of the first TSID field are each an integer value from 0 to 7.

In Example 5, the subject matter of Example 3 can optionally include where the circuitry is further configured to: configure the MPDU with the user priority of the first TSID field.

In Example 6, the subject matter of any of Examples 1-5 can optionally include where the constraint restricts the second STA to transmit MPDUs with an access category of a second TSID that corresponds to an access category of the first TSID field.

In Example 7, the subject matter of any of Examples 1-6 can optionally include where the circuitry is further configured to: receive a second MPDU from the second wireless STA, where the second MPDU indicates that an immediate response is requested and that there are more PPDUs that the second wireless STA has to transmit; and provide the second wireless STA with another reverse grant based on the received second MPDU.

In Example 8, the subject matter of any of Examples 1-7 can optionally include where the first wireless STA operates in accordance with one or more of the following group: service period channel access (SPCA), enhanced distributed channel access (EDCA), and SPCA-EDCA (SEMM).

In Example 9, the subject matter of any of Examples 1-8 can optionally include where the first wireless STA operates in accordance with one or more of the following group: Institute of Electronic and Electrical Engineers (IEEE) 802.11, IEEE 802.11ad, 60 GHZ local area network (LAN), 60 GHz personal area network (PAN), next generation 60 GHz, and directional multi-gig (DMG).

In Example 10, the subject matter of any of Examples 1-8 can optionally include where the first wireless STA and the second STA operate in accordance with a peer-to-peer protocol.

In Example 11, the subject matter of any of Examples 1-10 can optionally include where the circuitry is further configured to: contend for a wireless medium; transmit a second MPDU that indicates a duration for a transmission opportunity; and where the MPDU is transmitted to the second wireless STA in the transmission opportunity.

In Example 12, the subject matter of any of Examples 1-11 can optionally include where the circuitry is further configured to: transmit the MPDU to the second wireless STA.

In Example 13, the subject matter of any of Examples 1-12 can optionally include memory coupled to the circuitry.

In Example 14, the subject matter of Example 13 can optionally include one or more antennas coupled to the circuitry.

Example 15 is a method for quality of service signaling for reverse direction protocol performed by a first wireless station (STA). The method may include generating a media access control (MAC) protocol data unit (MPDU); configuring a reverse direction grant (RDG) field of the MPDU to indicate that the first wireless STA is to provide a reverse grant to a second wireless STA; configuring a destination address field of the MPDU to be an address of the second STA; configuring a first traffic stream identification (TSID) field of the MPDU to be a TSID associated with the MPDU; and configuring an access category constraint field of the MPDU to indicate to the second wireless STA a constraint on MPDUs that the second wireless STA can transmit in the reverse grant, where the constraint on MPDUs that the second wireless STA can transmit is based on the first TSID field.

In Example 16, the subject matter of Example 15 can optionally include where the constraint is that the second wireless STA transmit MPDUs with a second TSID field that has a same value as the first TSID field.

In Example 17, the subject matter of Example 15 can optionally include where the constraint is that the second wireless STA transmit MPDUs with a user priority of a second TSID field that corresponds to a user priority of the first TSID field.

In Example 18, the subject matter of Examples 15 can optionally include where the constraint is that the second STA transmit MPUDs with an access category of a second TSID field that corresponds to an access category of the first TSID field.

Example 19 is a first wireless station (STA) for quality of service signaling for reverse direction protocol including circuitry. The circuitry may be configured to: receive a media access control (MAC) protocol data unit (MPDU), wherein the MPDU includes: a reverse direction grant (RDG) field that indicates that a second wireless STA provides a reverse grant to the first wireless STA, a first traffic stream identification (TSID) field, and an access category constraint field that indicates to the first wireless STA a constraint on MPDUs that the first wireless STA can transmit in the reverse grant, where the constraint on MPDUs that the first wireless STA can transmit is based on the first TSID field; and transmit a second MPDU in accordance with the constraint on MPDUs that the first wireless STA can transmit.

In Example 20, the subject matter of Example 19 can optionally include where the constraint is that the first wireless STA transmit MPDUs with a second TSID that has a same value as the first TSID; and where the circuitry is further configured to: configure the second TSID field of the second MPDU to be the first TSID field of the first MPDU.

In Example 21, the subject matter of Example 19 can optionally include where the constraint is that the first wireless STA transmit MPDUs with a user priority of a second TSID field that corresponds to a user priority of the first TSID field.

In Example 22, the subject matter of Example 19 can optionally include where the constraint is that the first wireless STA transmit MPUDs with an access category of a second TSID field that corresponds to an access category of the first TSID field.

In Example 23, the subject matter of any of Examples 19-22 can optionally include memory and one or more antennas coupled to the circuitry. Example 24 is a non-transitory computer-readable storage medium that stores instructions for execution by one or more processors for quality of service signaling for reverse direction protocol performed by a wireless station (STA). The instructions configure the one or more processors to cause the wireless STA to: generate a first media access control (MAC) protocol data unit (MPDU); configure a reverse direction grant (RDG) field of the MPDU to indicate that the wireless STA is to provide a reverse grant to a second wireless STA; configure a destination address field of the MPDU to be an address of the second wireless STA; configure a first traffic stream identification (TSID) field of the MPDU to be a TSID associated with the MPDU; and configure an access category constraint field of the MPDU to indicate to the second STA a constraint on MPDUs that the second wireless STA can transmit in the reverse grant, where the constraint on MPDUs that the second wireless STA can transmit is based on the first TSID field.

In Example 25, the subject matter of Example 25 can optionally include where the constraint is at least one from the following group: that the second wireless STA transmit MPDUs with a second TSID field that has a same value as the first TSID field, that the second wireless STA transmit MPDUs with a user priority of a second TSID that corresponds to a user priority of the first TSID field, and that the second wireless STA transmit MPDUs with an access category of a second TSID field that corresponds to an access category of the first TSID field The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first wireless station (STA) for quality of service signaling for reverse direction protocol, comprising: memory; and, circuitry coupled to the memory, the circuitry configured to:
generate a media access control (MAC) protocol data unit (MPDU), the MPDU comprising:
a reverse direction grant (RDG) field of the MPDU to indicate that the first wireless STA is to provide a reverse grant to a second wireless STA,
a destination address field of the MPDU to be an address of the second wireless STA,
a first traffic stream identification (TSID) field of the MPDU to be a TSID associated with the MPDU, and
an access category constraint field of the MPDU to indicate to the second wireless STA a constraint on MPDUs that the second wireless STA can transmit in the reverse grant, wherein the constraint on MPDUs that the second wireless STA can transmit is based on the first TSID field; and
cause the circuitry of the first wireless STA to transmit a frame comprising the MPDU as a radio frequency signal; and
cause the circuitry to receive a second MPDU from the second wireless STA, wherein the second MDPU comprises one or more fields that are in accordance with the constraint, the constraint based on the first TSID field.

2. An apparatus of the first wireless STA of claim 1, wherein the constraint is that the second wireless STA transmit MPDUs with a second TSID field that has a same value as the first TSID field.

3. An apparatus of the first wireless STA of claim 1, wherein the constraint is that the second wireless STA transmit MPDUs with a user priority of a second TSID field that corresponds to a user priority of the first TSID field.

4. An apparatus of the first wireless STA of claim 3, wherein the user priority of the second TSID field and the user priority of the first TSID field are each an integer value from 0 to 7.

5. An apparatus of the first wireless STA of claim 3, wherein the circuitry is further configured to:
cause the circuitry to generate the MPDU with the user priority of the first TSID field.

6. An apparatus of the first wireless STA of claim 1, wherein the constraint restricts the second STA to transmit MPDUs with an access category of a second TSID that corresponds to an access category of the first TSID field.

7. An apparatus of the first wireless STA of claim 1, wherein the circuitry is further configured to:
cause the circuitry to receive a second frame comprising a third MPDU from the second wireless STA, wherein the third MPDU indicates that an immediate response is requested and that there are more PPDUs that the second wireless STA has to transmit; and
provide the second wireless STA with another reverse grant based on the received second MPDU.

8. An apparatus of the first wireless STA of claim 1, wherein the first wireless STA operates in accordance with one or more of the following group:
service period channel access (SPCA), enhanced distributed channel access (EDCA), and SPCA-EDCA (SEMM).

9. An apparatus of the first wireless STA of claim 1, wherein the first wireless STA is configured to operate at millimeter wave frequencies.

10. An apparatus of the first wireless STA of claim 1, wherein the first wireless STA and the second STA operate in accordance with a peer-to-peer protocol.

11. An apparatus of the first wireless STA of claim 1, wherein the circuitry is further configured to:
contend for a wireless medium;

configure the first wireless STA to transmit a second frame comprising a third MPDU that indicates a duration for a transmission opportunity; and wherein the MPDU is transmitted to the second wireless STA in the transmission opportunity.

12. An apparatus of the first wireless STA of claim 1, wherein the circuitry is further configured to:
configure the first wireless STA to transmit the MPDU to the second wireless STA.

13. An apparatus of the first wireless STA of claim 1, further comprising one or more antennas coupled to the circuitry.

14. A method for quality of service signaling for reverse direction protocol performed by an apparatus of a first wireless station (STA), the method comprising:
generating a media access control (MAC) protocol data unit (MPDU), the MPDU comprising:
a reverse direction grant (RDG) field of the MPDU to indicate that the first wireless STA is to provide a reverse grant to a second wireless STA,
a destination address field of the MPDU to be an address of the second STA,
a first traffic stream identification (TSID) field of the MPDU to be a TSID associated with the MPDU, and
an access category constraint field of the MPDU to indicate to the second wireless STA a constraint on MPDUs that the second wireless STA can transmit in the reverse grant, wherein the constraint on MPDUs that the second wireless STA can transmit is based on the first TSID field; and
configuring the first wireless STA to transmit a frame comprising the MPDU as a radio frequency signal; and
process a second MPDU from the second wireless STA, wherein the second MDPU comprises one or more fields that are in accordance with the constraint, the constraint based on the first TSID field.

15. The method of claim 14, wherein the constraint is that the second wireless STA transmit MPDUs with a second TSID field that has a same value as the first TSID field.

16. The method of claim 14, wherein the constraint is that the second wireless STA transmit MPDUs with a user priority of a second TSID field that corresponds to a user priority of the first TSID field.

17. The method of claim 14, wherein the constraint is that the second STA transmit MPUDs with an access category of a second TSID field that corresponds to an access category of the first TSID field.

18. An apparatus of a first wireless station (STA) for quality of service signaling for reverse direction protocol, comprising: memory; and circuitry coupled to the memory, the circuitry configured to:
cause the circuitry to process a media access control (MAC) protocol data unit (MPDU), wherein the MPDU includes:
a reverse direction grant (RDG) field that indicates that a second wireless STA provides a reverse grant to the first wireless STA, a first traffic stream identification (TSID) field, and an access category constraint field that indicates to the first wireless STA a constraint on MPDUs that the first wireless STA can transmit in the reverse grant, wherein the constraint on MPDUs that the first wireless STA can transmit is based on the first TSID field;
determine whether the first wireless STA has a second MPDU in accordance with the constraint, the constraint based on the first TSID field; and
in response to the first wireless STA having the second MPDU in accordance with the constraint based on the first TSID field, cause the circuitry of the first wireless STA to transmit a frame as a radio frequency signal, the frame comprising the second MPDU in accordance with the constraint on MPDUs that the first wireless STA can transmit.

19. The apparatus of the first wireless STA of claim 18, wherein the constraint is that the first wireless STA transmit MPDUs with a second TSID that has a same value as the first TSID; and wherein the circuitry is further configured to:
configure the second TSID field of the second MPDU to be the first TSID field of the MPDU.

20. The apparatus of the first wireless STA of claim 18, wherein the constraint is that the first wireless STA transmit MPDUs with a user priority of the second TSID field that corresponds to a user priority of the first TSID field.

21. The apparatus of the first wireless STA of claim 18, wherein the constraint is that the first wireless STA transmit MPUDs with an access category of a second TSID field that corresponds to an access category of the first TSID field.

22. The apparatus of the first wireless STA of claim 18, further comprising one or more antennas coupled to the circuitry.

23. A non-transitory computer-readable storage medium that stores instructions for execution by one or more processors for quality of service signaling for reverse direction protocol performed by an apparatus of a first wireless station (STA), the instructions to configure the one or more processors to cause the apparatus of the wireless STA to:
generate a media access control (MAC) protocol data unit (MPDU), the MPDU comprising:
a reverse direction grant (RDG) field of the MPDU to indicate that the first wireless STA is to provide a reverse grant to a second wireless STA,
a destination address field of the MPDU to be an address of the second wireless STA,
a first traffic stream identification (TSID) field of the MPDU to be a TSID associated with the MPDU, and
an access category constraint field of the MPDU to indicate to the second wireless STA a constraint on MPDUs that the second wireless STA can transmit in the reverse grant, wherein the constraint on MPDUs that the second wireless STA can transmit is based on the first TSID field; and
configure the first wireless STA to transmit a frame comprising the MPDU as a radio frequency signal; and
process a second MPDU from the second wireless STA, wherein the second MDPU comprises one or more fields that are in accordance with the constraint, the constraint based on the first TSID field.

24. The non-transitory computer-readable storage medium of claim 23, wherein the constraint is at least one from the following group:
that the second wireless STA transmit MPDUs with a second TSID field that has a same value as the first TSID field, that the second wireless STA transmit MPDUs with a user priority of a second TSID that corresponds to a user priority of the first TSID field, and that the second wireless STA transmit MPDUs with an access category of a second TSID field that corresponds to an access category of the first TSID field.

25. The apparatus of claim 1, wherein the memory is configured to store the MPDU.

* * * * *